United States Patent Office 2,967,872
Patented Jan. 10, 1961

2,967,872

PROCESS FOR MAKING ACYL TAURIDES

Carl Peer Lorentzen, Indianapolis, Ind., assignor to The Procter & Gamble Company, Cincinnati, Ohio, a corporation of Ohio No Drawing. Filed Dec. 18, 1958, Ser. No. 781,189

6 Claims. (Cl. 260—401)

This invention relates to a process for making N-higher acyl taurine salts.

N-higher acyl taurides are well known surface active agents and synthetic detergents, and have the formula:

$$RCONCH_2CH_2SO_3M$$
$$|$$
$$X$$

in which RCO is a higher acyl radical having about 8 to about 22 carbon atoms, X is hydrogen or an alkyl radical having from 1 to 4 carbon atoms and M is an alkali metal, alkaline earth metal, magnesium, ammonium or substituted ammonium.

The methods heretofore used for the manufacture of acyl taurides involve a number of disadvantages. The process most commonly used commercially for the manufacture of acyl taurides is the reaction of a higher acyl chloride with a taurine salt in an aqueous alkaline solution according to the following equation:

(1)
$$RCOCl + HNCH_2CH_2SO_3M + MOH \longrightarrow$$
$$|$$
$$X$$
$$RCONCH_2CH_2SO_3M + MCl + H_2O$$
$$|$$
$$X$$

(wherein RCO, M and X are as noted above). The alkaline agent is required to neutralize the hydrogen chloride formed by the acyl chloride.

There is usually a side reaction according to the following equation:

(2)   $RCOCl + 2MOH \rightarrow RCOOM + MCl + H_2O$

Thus, the formation of inorganic chloride salts and usually soap is unavoidable in the acyl chloride route of making acyl taurides. Moreover reaction (1) does not readily go to completion without the use of excess taurine salt. Unreacted taurine salt, therefore, usually is present in the final reaction product. The acyl chloride method is described in detail in Industrial and Engineering Chemistry, volume 42, page 1626 (1950).

The aforementioned chloride, soap and amine impurities are difficult to separate from the acyl tauride if a pure product is desired. Moreover, the presence of a chloride salt such as sodium chloride with the acyl tauride is undesirable because the salt imparts hygroscopicity and corrosiveness to the product.

Various modifications to the acyl chloride method for making acyl taurides have been proposed in order to reduce the formation of these undesirable byproducts. The suggested modifications have not successfully eliminated undesirable byproduct formation and have generally involved carefully controlled operating conditions which have not simplified the process.

In addition, corrosion problems are involved in the preparation of acyl chloride as an acylating agent in the acyl chloride method since phosphorus trichloride is usually used in the manufacture of this agent.

Another method which has been proposed for making acyl taurides involves the reaction of free fatty acid with a taurine salt according to the following equation:

$$RCOOH + HNCH_2CH_2SO_3M \longrightarrow RCONCH_2CH_2SO_3M + H_2O$$
$$|\qquad\qquad\qquad\qquad\qquad\qquad\qquad\quad |$$
$$X\qquad\qquad\qquad\qquad\qquad\qquad\qquad\quad X$$

(wherein RCO, X and M are as noted above).

In order for this reaction to take place the removal of water and the use of high temperatures and an inert atmosphere are necessary.

It is the object of this invention to provide a simple, rapid and complete process for making N-higher acyl taurides having a minimum of critical operating conditions which process does not result in the formation of byproducts which are difficult to remove.

It has been discovered that this and other objects can be attained by using higher molecular weight fatty acid anhydrides instead of the chlorides or free acids and by employing at least equimolar proportions thereof in relation to the taurine salt, the reaction taking place in the absence of alkaline agents, with agitation, and at a temperature above the melting point of the anhydride. The reaction product is a mixture of the acylated tauride and free fatty acid substantially free from soap, inorganic salt and unreacted amine impurities. The free fatty acid can be separated easily from the acyl tauride, if desired, by a number of methods hereinafter described.

Higher fatty acid anhydrides hydrolyze very slowly as compared with lower fatty acid anhydrides which react quite rapidly with water and which have properties different in most respects from the higher homologues. Moreover, because of this apparent low reactivity, higher fatty acid anhydrides have enjoyed little commercial use as compared to the lower homologues. It was, therefore, surprising to find that the higher fatty acid anhydrides reacted so rapidly, easily and completely with taurine salts to form acyl taurides. It was particularly surprising to discover that the reaction of the higher fatty acid anhydrides with taurine salts in the presence of water apparently is much faster than the hydrolysis of the anhydrides, thus enabling employment of aqueous media in carrying out the reaction.

The higher fatty acid anhydrides used as the acylating agent in the process of this invention have the formula $(RCO)_2O$ wherein RCO is an acyl radical ranging in chain length from about 8 to about 22 carbon atoms. Preferred acyl taurides are those obtained using, as acylating agents, higher fatty acid anhydrides with acyl chains raiging from 10 to 18 carbon atoms in length. Higher fatty acid anhydrides can be prepared from higher fatty acids or their derivatives by a number of known methods. One method is the dehydration of a higher fatty acid with a lower fatty acid anhydride such as acetic acid anhydride.

Examples of acylating agents which can be used in the process of this invention are the anhydrides of higher saturated and unsaturated fatty acids such as caprylic acid, capric acid, lauric acid, myristic acid, palmitic acid, stearic acid, oleic acid, linoleic acid, and the mixtures of the fatty acids which are derived from natural fats and oils such as tallow, coconut oil, palm kernel oil, soybean oil, whale oil, fish oil, tall oil and the like.

The taurine salts which can be used in the process of this invention have the formula:

$$HNCH_2CH_2SO_3M$$
$$|$$
$$X$$

wherein X is hydrogen or an alkyl radical having from one to four carbon atoms such as methyl, ethyl, isopropyl or isobutyl and M is an alkali metal (i.e. sodium or potassium), alkaline earth metal (i.e. calcium), magnesium, ammonium, or ethanol or propanol substituted ammonium (e.g. triethanolamine). Acyl taurides with excellent surface active and detergent characteristics are obtained using sodium N-methyl taurine in the reaction of this invention.

Outstanding acyl taurides for surface active and detergent purposes are those prepared with oleic acid anhydride or coconut oil fatty acid anhydride as the actylating agent. Whole coconut oil fatty acids usually comprise about 7.5% caprilic acid, 8% capric acid, 45% lauric acid, 18% myristic acid, 9.5% palmitic acid, 2.5% stearic acid, 8% oleic acid and 1.5% linoleic acid. In general, all of the oils in the coconut oil group, which is defined as a group of tropical nut oils characterized by their high content of combined fatty acids having ten to fourteen carbon atoms, find application as a preferred source for the fatty acid anhydride acylating agent in this invention.

The reaction of the process of this invention is illustrated by the following equation:

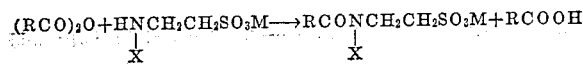

(where RCO, X and M are as noted above).

The reaction is rapid and exothermic. In order for the reaction to be complete, it is essential that at least one mole of higher fatty acid anhydride be used for each mole of taurine salt. Fatty acid anhydride in excess of one mole per mole of taurine salt is not required, but such larger amounts may be used. If at least one mole of fatty acid anhydride per mole of taurine salt is not used, the free fatty acid formed will react with the taurine salt remaining as an excess, after all of the fatty acid anhydride has reacted, to form an undesirable amine soap according to the following reaction:

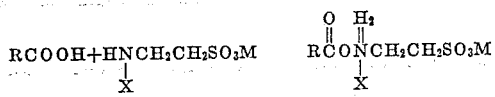

(where RCO, X and M are as noted above). However, if at least one mole of fatty acid anhydride per mole of taurine salt is used, this undesirable side reaction does not take place since the taurine salt has a much greater tendency to react with the anhydride than the free fatty acid. There is no critical upper limit to the number of moles of higher fatty acid anhydride which can be reacted with each mole of taurine salt. Practical considerations, such as the amount of free fatty acid or fatty acid anhydride in the final reaction product to be utilized or removed, indicate that not more than about two moles of higher fatty acid anhydride should be reacted with each mole of taurine salt.

The fatty acid anhydrides and the taurine salts can be the sole reactants in the process of this invention. No catalysts or alkaline agents are desirable, nor are they required for the reaction to proceed to completion. An alkaline agent is an agent such as sodium hydroxide which will saponify the fatty acid in the reaction mixture. A combination of soap and acyl tauride has beneficial uses as a cleansing agent for example, but a process where the formation of soap is not the normal result is one of the outstanding advantages of this invention. Soapless detergent compositions are advantageous in hard water areas where the presence of soap tends to cause curd formation which may detract from the performance of the synthetic detergent.

The reaction of this invention proceeds to completion at comparatively low temperatures. Since the simplicity, rapidity, and completeness of the process are obtained when the fatty acid anhydride is in the liquid form, the temperature of the reaction should be above the melting point of the fatty acid anhydride. If the fatty acid anhydride is molten, no additional heating is required but may be done. Temperatures as low as about 50° F. can be used so long as the fatty acid anhydride used is in liquid form. Preferred reaction temperatures are in the range of about 100° F. to about 400° F., particularly about 140° F. to about 300° F. There is a tendency for the reaction mixture to be unstable above about 400° F.

Agitation is required for the reaction to take place. The reaction is complete in less than 30 minutes; usually it is complete in a few minutes. The reaction proceeds readily at atmospheric pressure. After the reaction is complete, a mixture of acyl tauride and free fatty acid is obtained which is usually homogeneous.

The taurine salt as a dry solid can be added to molten fatty acid anhydride, but it is preferable that the taurine salt be added in the form of an aqueous solution to facilitate control of the process; for example, agitation of reaction mixture is more simple and reaction temperatures can be lower. If water is present, any excess fatty acid anhydride tends to hydrolyze slowly to free fatty acid after the principal reaction is complete. Dry taurine salt in the reaction mixture requires more agitation to ensure adequate contact with the anhydride and a complete reaction. About a 50% to 85% aqueous solution of the taurine salt (preferably about 75%) has been found to result in optimum reaction characteristics. A more dilute solution slows the reaction; a more concentrated solution requires increased agitation for a complete reaction. The reaction also can take place in an inert solvent such as ethylene dichloride or acetone, or such a solvent can be added to an aqueous reaction mixture, if a decrease in viscosity and temperature is desired.

If water is present in the reaction mixture and the temperature of the reaction tends to rise above the boiling point of the water, water is merely driven off without interfering with the reaction. Any water present after the reaction is complete is dispersed in the mixture of fatty acid (free and any excess unhydrolyzed anhydride) and acyl tauride.

The resulting product of the process of this invention, a mixture of acyl tauride and free fatty acid (including any excess unhydrolyzed anhydride), is useful per se in the manufacture of detergent bars, for example, where the fatty acid acts as a binding agent for the acyl tauride. This product can be made directly into detergent bars by conventional bar milling or framing processes, for example, after an appropriate adjustment of the water level in the mixture.

The reaction mixture of acyl tauride and free fatty acid can be made into a mixture of synthetic detergent and soap free from inorganic and taurine salts simply by saponifying the free fatty acid by the addition of a caustic soda solution or another base such as triethanolamine. It was observed that the neutralization of the free fatty acid in the reaction mixture with caustic soda is very rapid at about 180° F. Such a mixture of acyl tauride and soap is useful in cleansing operations, especially in soft water.

Ordinarily it is desirable to remove the free fatty acid (including any anhydride present) from the acyl tauride to yield a substantially impurity-free surface active product. There are many uses for acyl tauride in which the presence of free fatty acids (which are substantially water insoluble) would not be desirable, particularly in large quantities. Such uses include, clear shampoos, textile processing, metal cleaning, electroplating baths, dentifrices and pharmaceutical preparations.

It is comparatively easy to separate the free fatty acid from the acyl tauride. One separation method is to mix the product of the reaction with a preferential solvent for the fatty acid (including any anhydride present) and draw off the solution of fatty acid by decanting or centrifuging for example. An amount of solvent in excess of that required to dissolve all of the fatty acid present should be used. Many of the conventional preferential solvents for fatty acids, which are insoluble in water, such as petroleum ether (ligroin), ethylene dichloride, benzene and other hydrocarbons, chlorinated hydrocarbons, ethers and ketones effect a precipitation of the acyl tauride from the reaction mixture because of a large reduction in the solubility of the acyl tauride in the overall system. The precipitation of the acyl tauride in this case makes the separation of the reaction products even more simple. It was observed that acetone, which is miscible with water, is a particularly effective fatty acid solvent and acyl tauride precipitant for the reaction mixture, precipitating the acyl tauride as a sandy, easily-filterable product. Acetone addition in excess of a weight ratio of about 5:1, preferably 10:1 (acetone: reaction products) effects a very good precipitation and separation of the acyl tauride from the fatty acid in the reaction mixture.

Another method of separating the free fatty acid from the acyl tauride involves the addition of powdered calcium hydroxide and water to the reaction product sufficient to precipitate the free fatty acid in the form of insoluble calcium soap and thereafter filtering out this soap leaving an aqueous solution of salt-free, soap-free acyl tauride.

Other known methods of separation may be used, such as steam distillation of the free fatty acid from the acyl tauride.

The completeness of the reaction of fatty acid anhydride and taurine salt is determined by comparing the total combined $SO_3$ present in any form in the reaction mixture with the combined $SO_3$ present in the form of the acyl tauride in the reaction mixture. The difference in these two values will be the amount of combined $SO_3$ in the form of the unreacted taurine salt.

The total combined $SO_3$ is determined by the conventional Parr bomb method. The amount of acyl tauride present is determined by the methylene blue method for quantitative determination of sulfated and sulfonated surface active agents and detergents which is described in Nature, 160, 759 (1947), and Trans. Faraday Soc., 44, 226–230 (1948). The $SO_3$ combined with the acyl tauride is then calculated and compared with the total combined $SO_3$. This indicates reaction completeness. As an additional check, the amount of unreacted taurine salt is also determined by a colorimetric method which is specific to secondary amines described in Anal. Chim. Acta, 15, 158 (1956). Comparisons of the measurements of unreacted taurine salts with the amounts of original reactants used, and titration measurements of free fatty acids extracted from the reaction mixture indicate the presence or absence of any side reactions or decomposition of the taurine salts. Analyses and comparisons as described above of a large number of reaction mixtures indicated that the reaction between fatty acid anhydrides and taurine salts described herein is greater than about 90% complete and usually the reaction is about 99% complete.

The following examples will serve to illustrate the practice of the process of this invention, but the invention is not limited to these specific examples, other variations being readily discernible to those skilled in the art after reading the description of the invention herein contained.

In the following examples, parts are by weight.

*Example I*

161 parts (one mole) of dry sodium N-methyl taurine were mixed with 421 parts (1.1 moles) of molten lauric acid anhydride and reacted with agitation in a mixing vessel at 300° F. for 15 minutes when the reaction was complete. The reaction mixture was allowed to cool and then mixed with about 2000 parts of a 50% aqueous ethanol solution. The lauric acid was then extracted three times from the aqueous ethanol solution of acyl tauride, each time with about 2000 parts of petroleum ether (ligroin). The resulting sodium N-methyl N-lauroyl tauride contained about 7.9% lauric acid and was salt-free, soap-free and free from sodium N-methyl taurine.

It is suitable for use, for example, in a heavy duty granular detergent which contains about three times its weight of sodium tripolyphosphate or in a milled detergent bar which contains about two times its weight of a mixture containing 75% tallow soap and 25% coconut oil soap.

*Example II*

382 parts (1 mole) of the molten anhydride of fractionated coconut oil fatty acids in which the acyl radicals averaged 12 carbon atoms, 131 parts (.81 mole) of sodium N-methyl taurine and 148 parts of water were mixed together in a reaction vessel at about 180° F. The reaction took place with agitation and was complete in a few minutes with the temperature rising to about 220° F. because of the heat of the reaction. Acetone was added slowly to the fluid mixture with agitation. The acetone dissolved the free coconut oil fatty acids and caused a sandy precipitation of the sodium N-methyl-N-coconut oil fatty acid tauride. When most of this acyl tauride was precipitated, the acetone was added in a larger amount until acetone in an amount about 10 times by weight of the original reactants had been added. The precipitated acyl tauride was filtered from the solution of fatty acid in acetone. The precipitate was washed with 10 times its weight of acetone and the acyl tauride was again filtered. The washed precipitate of sodium N-methyl-N-coconut oil fatty acid tauride contained about 0.75% free fatty acid.

The same procedure was repeated using 542 parts (1 mole) of the anhydride of hydrogenated tallow fatty acids consisting of about 85% stearic acid and 15% palmitic acid, and 146 parts of sodium N-methyl taurine (0.91 mole) in 54 parts of water (73% solution). The washed precipitate of sodium N-methyl N-tallow fatty acid tauride contained about 11% of tallow fatty acids.

The same procedure was repeated again using 542 parts (0.99 mole) of oleic acid anhydride and 146 parts of sodium N-methyl taurine (0.91 mole) in 54 parts water (73% solution). The washed precipitate of sodium N-methyl N-oleoyl tauride contained about 1% oleic acid.

The sodium N-methyl N-coconut oil fatty acid tauride, sodium N-methyl-N-tallow fatty acid tauride and sodium N-methyl N-oleoyl tauride obtained in this example were free from soap, salt and unreacted taurine salt and are useful as emulsifiers, wetting agents and detergents. They can be used in laundering operations, in textile processing and in agricultural wettable powders.

Simple, rapid and complete reactions, comparable to those in Examples II and resulting in salt-free and soap-free acyl taurides free from unreacted taurine salts, are obtained when sodium, potassium, ammonium, calcium, magnesium or triethanolamine salts of taurine, N-ethyl taurine, N-isopropyl taurine or N-isobutyl taurine are substituted, in equivalent amounts for the sodium N-methyl taurine in the process described in Example II.

*Example III*

To about 412 parts (1 mole) of the molten anhydride of whole coconut oil fatty acids (described above) heated to about 140° F. is added about 161 parts (one mole) of sodium N-methyl taurine in about 54 parts of water (75% solution). The mixture is agitated and the reaction is complete in about one minute with the temperature rising to about 200° F. due to the heat of reaction. The reaction product is a homogeneous mixture of about 358 parts of taurine salt-free, inorganic salt-free, soap-free sodium N-methyl N-coconut oil fatty acid tauride in about 215 parts coconut oil fatty acids with water originally present dispersed in the mixture. To this reaction product is added with agitation about 6000 parts of acetone; this mixture is then cooled to about 60° F. and the precipitated acyl tauride is filtered off. To this precipitate is added with agitation about 4000 parts of acetone and again filtered. The resulting residue of sodium N-methyl coconut oil fatty acid tauride contains less than about 0.5% coconut oil fatty acid and is suitable for use, for example, as a foaming agent in a dentifrice or a surface active agent in cosmetics.

What is claimed is:

1. A process for the production of higher acyl taurides which comprises reacting, with agitation, at least one mole of a higher molecular weight fatty acid anhydride with one mole of taurine salt in aqueous solution having the formula $$HNCH_2CH_2SO_3M$$
$$|$$
$$X$$

where X is selected from the group consisting of hydrogen and alkyl radicals having one to four carbon atoms and M is selected from the group consisting of alkali metal, alkaline earth metal, magnesium, ammonium and substituted ammonium, in the absence of alkaline agents at a temperature above the melting point of said anhydride whereby the reaction product is a mixture of said taurides and free higher molecular weight fatty acids substantially free from inorganic salts, soaps and unreacted taurine salt.

2. The process of claim 1 in which the reaction temperature is in the range of about 100° F. to about 400° F. and the reaction products are separated from each other.

3. The process of claim 2 in which the taurine salt is sodium N-methyl taurine and the anhydride is of higher fatty acids ranging in chain length from about 10 to about 18 carbon atoms.

4. The process of claim 3 in which the sodium N-methyl taurine is in an about 50% to about 85% aqueous solution.

5. The process of claim 3 in which the anhydride is coconut oil fatty acid anhydride.

6. The process of claim 3 in which the anhydride is oleic acid anhydride.

References Cited in the file of this patent

UNITED STATES PATENTS

| | | |
|---|---|---|
| 1,932,179 | Guenther et al. | Oct. 24, 1933 |
| 2,008,649 | Ulrich et al. | July 16, 1935 |
| 2,009,346 | Schirm | July 23, 1935 |
| 2,368,067 | Lynch | Jan. 23, 1945 |